United States Patent [19]

Parrott et al.

[11] Patent Number: 4,569,451

[45] Date of Patent: Feb. 11, 1986

[54] CONNECTOR STRUCTURE FOR TUBULAR MARGINAL CONSTRUCTIONS

[75] Inventors: Robert C. Parrott; Smith A. Meadors, both of Greenville, S.C.

[73] Assignee: Gower Corporation, Greenville, S.C.

[21] Appl. No.: 597,497

[22] Filed: Apr. 6, 1984

[51] Int. Cl.[4] .................................................. A47F 5/00
[52] U.S. Cl. .................................... 211/191; 211/182; 403/232.1
[58] Field of Search ............... 211/191, 182, 190, 189, 211/206, 193, 187; 248/214; 403/217, 219, 232.1, 233, 262

[56] References Cited

U.S. PATENT DOCUMENTS

| | | | |
|---|---|---|---|
| 1,406,723 | 2/1922 | Caldwell | 403/232.1 |
| 3,877,579 | 4/1975 | Weider | 211/206 X |
| 4,124,123 | 11/1978 | Armington et al. | 211/191 X |
| 4,411,548 | 10/1983 | Tschan | 403/232.1 |
| 4,450,971 | 5/1984 | Kashiwabara | 211/182 X |

FOREIGN PATENT DOCUMENTS

| | | | |
|---|---|---|---|
| 294020 | 6/1968 | Austria | 211/191 |
| 93998 | 5/1959 | Norway | 403/232.1 |

*Primary Examiner*—Robert W. Gibson, Jr.
*Attorney, Agent, or Firm*—Bailey & Hardaway

[57] ABSTRACT

A connector structure is illustrated for use in a modular steel structure of the type which is assembled on the site, utilizing opposed pairs of vertical flange-like members on each side of a tubular column together with a horizontal web member for accommodating the tubular column for erection of a mezzanine or rack for palletized material and the like.

2 Claims, 5 Drawing Figures

CONNECTOR STRUCTURE FOR TUBULAR MARGINAL CONSTRUCTIONS

BACKGROUND OF THE INVENTION

The connector structure of the invention is illustrated in connection with a mezzanine structure of the type supplied by the storage rack division of Republic Steel Corporation and sold under the trademark CLERESPAN. When attaching horizontal structural members, as for example, to act as floor joists for supporting the deck of a mezzanine, it is necessary that such be spaced laterally of the column and affixed to the beam in such a fashion that the tubular bracing member must be spaced below the beam, thus increasing the depth of ceiling resulting in lost overhead space. Furthermore, a number of unwieldly connectors must be put in place resulting in lost erection time with duplication of structural members.

Accordingly, it is an important object of this invention to facilitate the installation of an on site modular steel structure in such a way as to simplify assembly of the tubular members and associated supports.

Another important object of the invention is to simplify the connector structures in such assemblies reducing assembly time and eliminating duplication of unwieldly connecting members.

Still another important object of the invention is to provide a simplified modular structure having connectors which may be easily assembled to provide rugged support for horizontal members minimizing lost space especially through minimization of the depth of ceiling structures.

SUMMARY OF THE INVENTION

It has been found that a connector structure for modular steel structures assembled on the site may be provided utilizing a horizontal web connector member for accommodating a column utilizing a pair of depending web-like members integral therewith for ready securement to opposed vertical flanges carried by horizontal supports on either side of the column. Preferably a depending web member is afforded at the free ends of the web member for embracing the horizontal supports opposite the vertical flange-like members.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A connector structure is illustrated for use in joining and bracing an upright tubular column with a horizontal structural member. The tubular column supports horizontal beam members extending across the horizontal structural member. A bracket member A is carried by the horizontal structural member and includes a horizontal web member, and a pair of spaced depending members carried by a terminal end of the web members. The depending members extend over the beam members and are spaced sufficiently to accommodate the column therebetween. A pair of spaced upright flanges B are carried adjacent the horizontal web members opposite the column receiving members having spaced fastening means therein. An upright leg C is carried on each side of the column opposite the spaced upright flanges. Spaced fastening means are carried by the legs opposite fastening means in the upright flanges.

Figure 5:
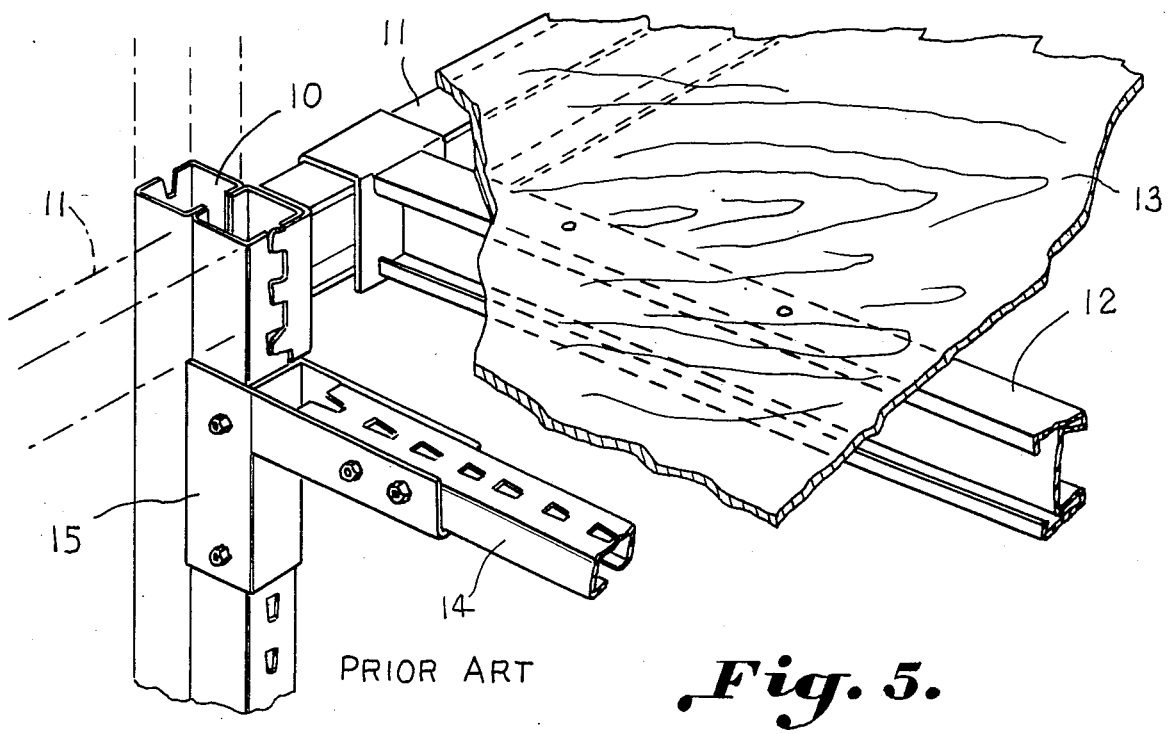
FIG. 5 is a perspective view illustrating connector means according to the prior art for forming a juncture with a tubular column.

Referring to FIG. 5, the prior art is illustrated as including an upright tubular column 10 having supporting beam member 11 extending thereacross for supporting horizontal beam members 12 which carry a mezzanine floor 13. A tubular bracing structure 14 must be spaced beneath the juncture between the beam members and the column and a substantially L-shaped connector bracket 15 is provided for connecting the member 14 beneath the beam members 11 as necessitated by the L-shaped connector.

Figure 1:
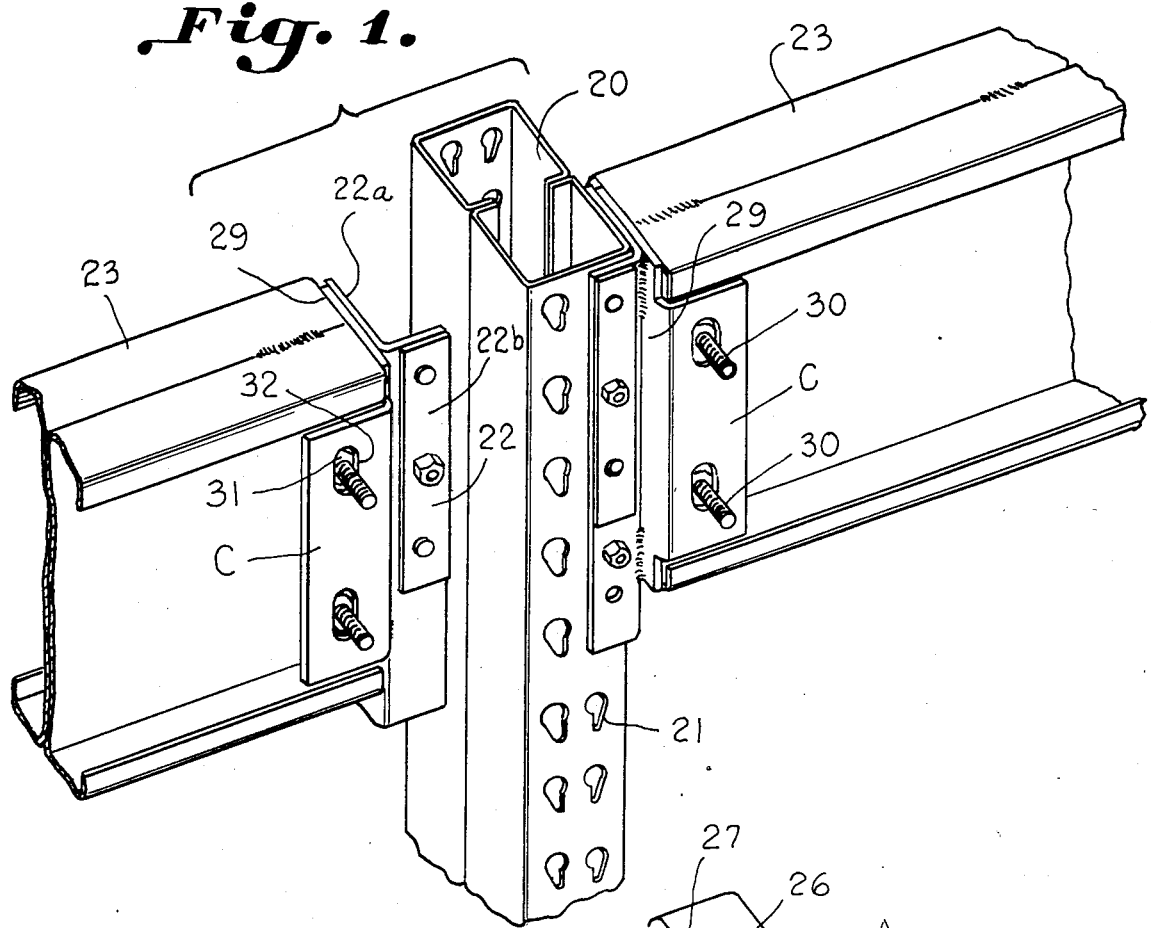
FIG. 1 is a perspective view illustrating a juncture between a column and a horizontal beam member wherein the beam member is provided with vertical flange-like connector leg members on either side of the column.

Referring more particularly to FIG. 1, an upright column is illustrated at 20 having spaced slots 21 for receiving connectors 22 which include vertical angles 22a carrying spring members 22b. However, any suitable connector or locking apparatus may be utilized as described in greater detail in copending application U.S. Ser. No. 458,164, filed Mar. 2, 1983, entitled Locking Apparatus for Storage Rack Assembly.

The horizontal beam members 23 are thus joined to the column in such a manner that they may be erected on site.

By utilizing the connector structure of the invention, a horizontal structural member such as the member 24 may be readily secured to the column at the juncture on the same level as the horizontal beam members 23 through the use of the bracket member and related connector structure manufactured in accordance with the present invention.

Figure 2:
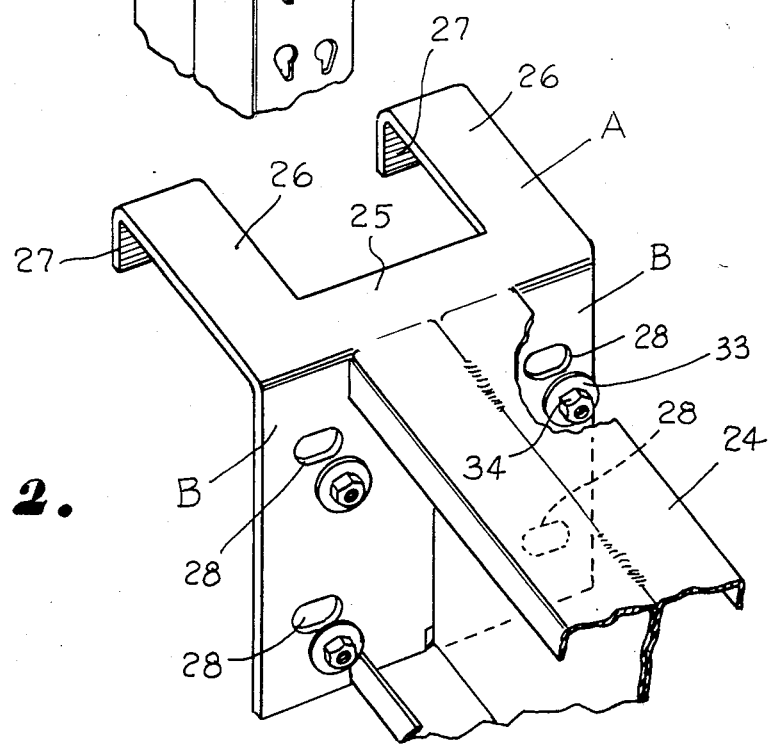
FIG. 2 illustrates a bracket member having a web member receiving the column with depending upright flanges for securement to flange-like leg members carried on either side of the column.

FIG. 2 illustrates a bracket member A which includes a horizontal web portion 25 which has integral therewith a pair of spaced column receiving members 26. Depending from the free ends of the column receiving members 26 is a pair of depending members 27 spaced as are the column receiving members 26 to receive the column 20.

A pair of spaced upright flanges are integrally carried by the web member 25 in such a way as to accommodate fastening members within the horizontally elongated slots 28. The flanges may be an integral member but are spaced in the sense of accommodating fastening members receivable upon the upright leg C carried on either side of the column 20. The flange-like leg members C are illustrated as being provided in the form of angles having opposite legs 29 which are secured to the horizontal supports 23 as by welding.

Suitable fastening members include threaded shank members 30 which have an enlarged head 31 for reception within an elongated vertical slot 32 within the leg C. A washer 33 is provided opposite the flange B to accommodate the nut 34.

Figure 3:
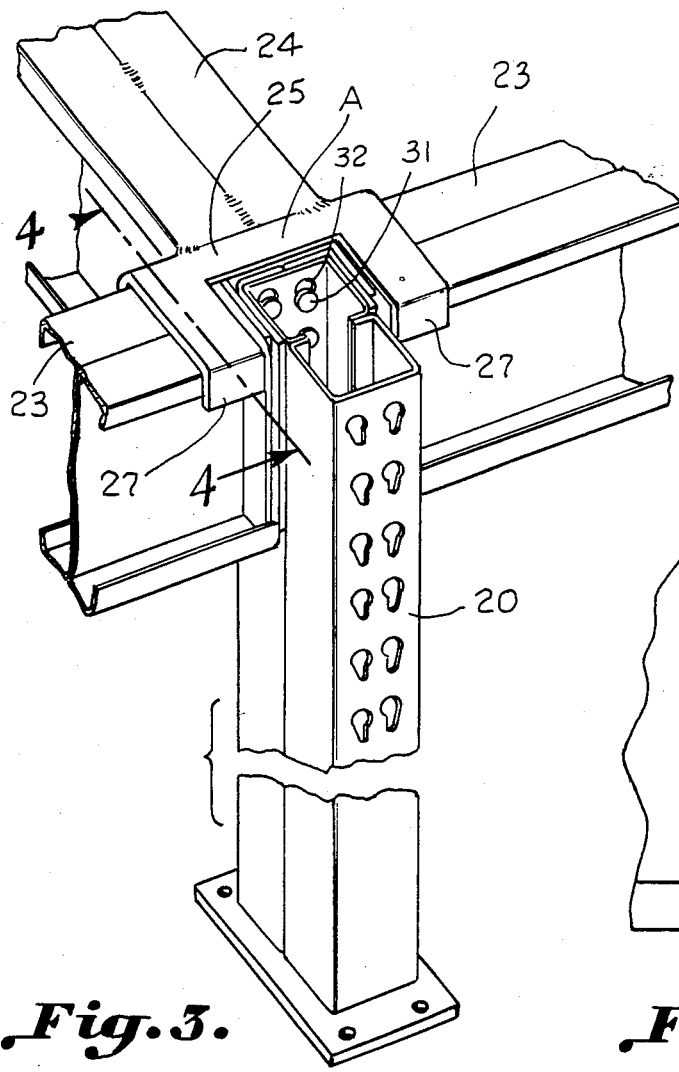
FIG. 3 is a perspective view looking toward the rear of FIG. 1 illustrating a connector structure in assembled relation according to the invention.

FIG. 3 illustrates the manner in which the depending members 27 carried by the web member 25 accommodate the beam 23 at the juncture with the upright tubular column 29. The head members 31 of the fasteners are received by the vertical elongated slots 32.

Figure 4:
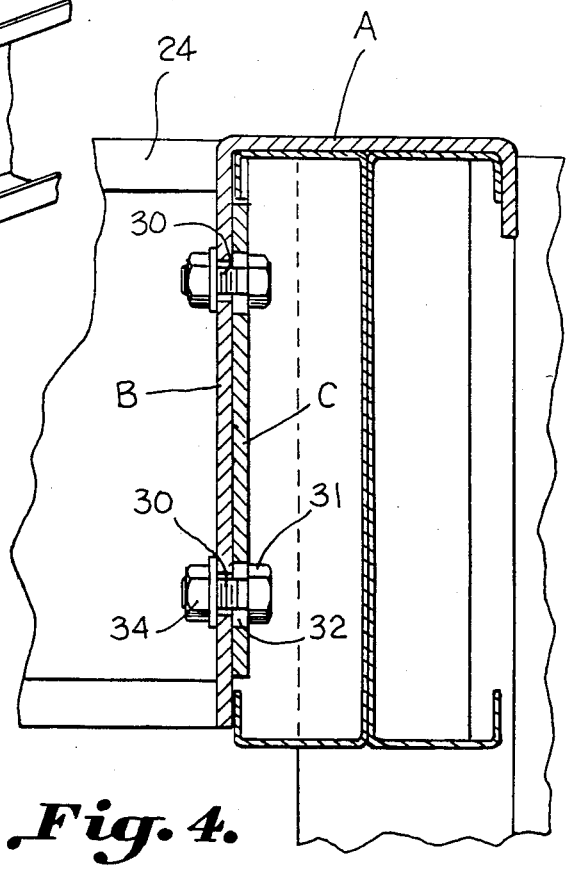
FIG. 4 is an enlarged transverse sectional elevation taken on the line 4—4 in FIG. 3.

FIG. 4 is an enlarged sectional elevation illustrating the securement between the horizontal member 24 and the connector member wherein the flange-like members B and C are connected by the threaded fastening members 30 through the use of the nut 34 and the head 31.

While a preferred embodiment of the invention has been described using specific terms, such description is for been described using specific terms, such description is for illustrative purposes only and it is to be understood that changes and variations may be made without departing from the spirit or scope of the following claims.

What is claimed is:

1. A connector structure for use in joining and bracing an upright tubular column with a horizontal structural member, said tubular column supporting a pair of horizontal beam members extending across said horizontal structural member comprising;
   a bracket member carried by said horizontal structural member including;
   a horizontal web member,
   said horizontal web member including a pair of spaced column receiving members,
   said column receiving members extending over said beam members and being spaced sufficiently to accommodate said column therebetween,
   a pair of upright flanges depending from said horizontal web member,
   a pair of upright legs carried by said horizontal beam members and mounted on on each side of said column opposite said spaced upright flanges;
   fastening means joining opposed upright flanges and upright legs.

2. The structure set forth in claim 1 wherein spaced depending members are carried by a free end of said column receiving members.

* * * * *